United States Patent [19]

Wernicke

[11] 4,440,320

[45] Apr. 3, 1984

[54] FOAM DISPENSING APPARATUS

[76] Inventor: Steven A. Wernicke, 407 E. Elm, Wheaton, Ill. 60187

[21] Appl. No.: 325,907

[22] Filed: Nov. 30, 1981

[51] Int. Cl.$^3$ .......................... B67D 5/60; B67D 1/08; B67D 5/08
[52] U.S. Cl. .................................. 222/145; 222/148; 222/639; 222/644; 239/112; 239/414
[58] Field of Search .................... 222/145, 148, 144.5, 222/129, 638, 639, 644; 239/112, 414, 70

[56] References Cited

U.S. PATENT DOCUMENTS

| | | | |
|---|---|---|---|
| 2,137,527 | 11/1938 | Cunningham | 222/144.5 X |
| 2,356,200 | 8/1944 | Bedard | 222/144.5 X |
| 2,779,627 | 1/1957 | Gray . | |
| 2,998,223 | 8/1961 | Baxter . | |
| 3,146,950 | 9/1964 | Lancaster . | |
| 3,334,648 | 8/1967 | Probst . | |
| 3,348,774 | 10/1967 | Wiggins . | |
| 3,403,695 | 10/1968 | Hopkins . | |
| 3,504,855 | 4/1970 | Volker . | |
| 3,572,366 | 3/1971 | Wiggins . | |
| 3,672,570 | 6/1972 | Scarbrough et al. . | |
| 3,674,205 | 7/1972 | Kock . | |
| 3,690,557 | 9/1972 | Higgins . | |
| 3,752,398 | 8/1973 | Svensson | 239/112 X |
| 3,900,163 | 8/1975 | Volker . | |
| 4,090,475 | 5/1978 | Kwan | 222/644 |
| 4,193,546 | 3/1980 | Hetherington et al. | 239/112 |
| 4,202,497 | 5/1980 | Ten Pas | 239/112 |
| 4,262,847 | 4/1981 | Stitzer et al. | 239/112 |

Primary Examiner—Robert B. Reeves
Assistant Examiner—Russell D. Stormer
Attorney, Agent, or Firm—Leydig, Voit, Osann, Mayer & Holt, Ltd.

[57] ABSTRACT

A foam dispenser for converting a plurality of foam components into an expanded foam which can be flushed with a cleaning solution after the foam is discharged is distinguished by the use of a rotary valve member corresponding to each foam component introduced into the dispenser to constitute the expanded foam. Each rotary valve member has a single passageway and is mounted for movement between positions in which (a) the passageway communicates with the tube carrying the foam component and (b) the passageway communicates with a tube carrying the cleaning solution, thus permitting cleaning of the dispenser at all points downstream of where the foam components enter the valve. The distance between where the foam component is introduced into the dispenser and the point where the foam component enters the valve is so short that no significant amounts of buildup of the foam component can occur. Further, all the valves are rotated in unison by a double-acting air cylinder between communication with the foam component carrying tubes and communication with the cleaning solution carrying tubes. Actuation of the air cylinder is controlled by a timing device, so that repeated dispensings of a predetermined volume of expanded foam are possible.

6 Claims, 6 Drawing Figures

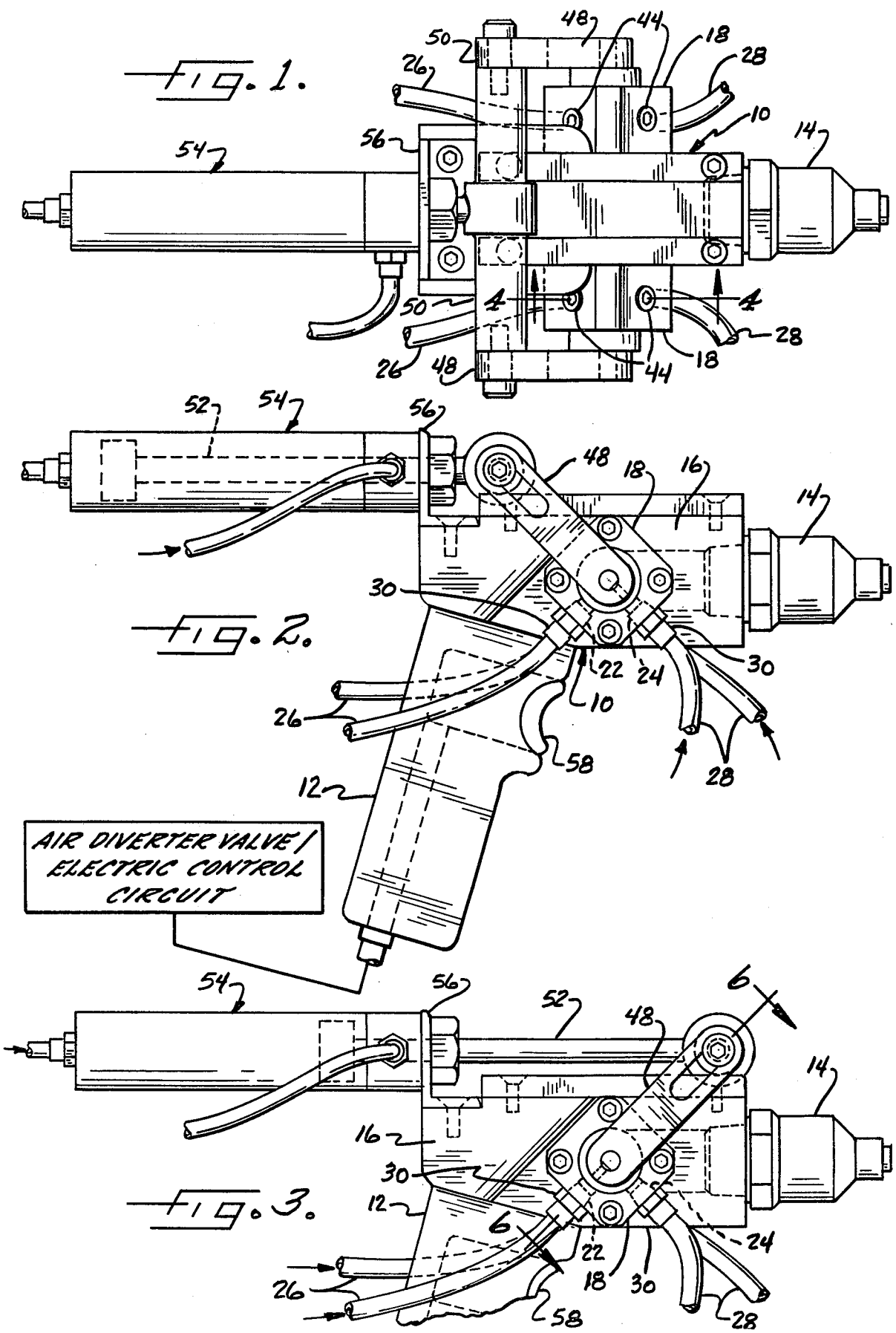

FOAM DISPENSING APPARATUS

BACKGROUND

This invention relates to the dispensing of expanded foams and, more particularly, to an improved foam dispensing gun.

Various foam dispensing guns have been proposed and used for mixing and expanding isocyanate, polyol and other foam components into polyurethane foam. When these components are mixed in proper proportions, as is well known, they react quickly to form an expanded foam and begin to solidify. Additionally, the component parts of the foam can begin to solidify by reacting with moisture available in the air. Thus, provision must be made for keeping the foam dispensing apparatus free from buildup of the component parts and the resulting expanded foam so that its control valves and passageways do not become clogged, rendering the apparatus inoperable.

Some prior foam dispensing apparatus required dismantling after each application in order that the dispenser be cleaned. Most foam dispensers of recent design have utilized integral means for cleaning the gun, with a solvent being introduced to the dispenser after its use to flush the expanded foam and unreacted components therefrom. However, experience with apparatus of this general nature has shown that, while an improvement over the dispensers which had to be disassembled for cleaning, adequate cleaning of the dispenser is not always provided.

The expanded foams generated by these apparatus are commonly used for insulation in, for example, refrigerator shells. Such shells require a fixed volume of foam—too much foam will split the shell, too little and the shell will not be adequately insulated. However, the foam dispensing guns of the prior art are not provided with means that enable the user to consistently dispense the identical volume of foam with each use of the dispenser.

It is, therefore, an object of the present invention to provide a foam dispensing apparatus of relatively simple construction, yet which may be readily cleaned after use. A related and more specific object provides a foam dispensing apparatus having an improved valve arrangement for controlling the flow of the foam components through the dispenser so that the valves, the passageways and the mixing chamber may be readily cleaned without disassembly, thus permitting the apparatus to be kept in operative condition at all times.

A further object lies in the provision of a foam dispensing apparatus having a configuration which promotes uniform mixing of the foam components.

Yet another object is to provide a dispensing apparatus valve system which is capable of timed actuation so that only a predetermined amount of expanded foam will be produced.

BRIEF DESCRIPTION OF THE DRAWINGS

These and other objects and advantages of the invention will become apparent upon reading the following detailed description and upon reference to the drawings, in which:

FIG. 1 is a top view of a foam dispensing apparatus in accordance with one embodiment of the present invention and illustrating the dispenser with the valves positioned so that a cleaning solvent is being admitted into the dispenser, FIG. 2 is a side elevation of the foam dispenser of FIG. 1;

FIG. 3 is a side elevation view similar to FIG. 2, except showing the valves being positioned so that the components of the foam are being admitted into the apparatus as would be occuring when foam is being dispensed;

Figure 4:
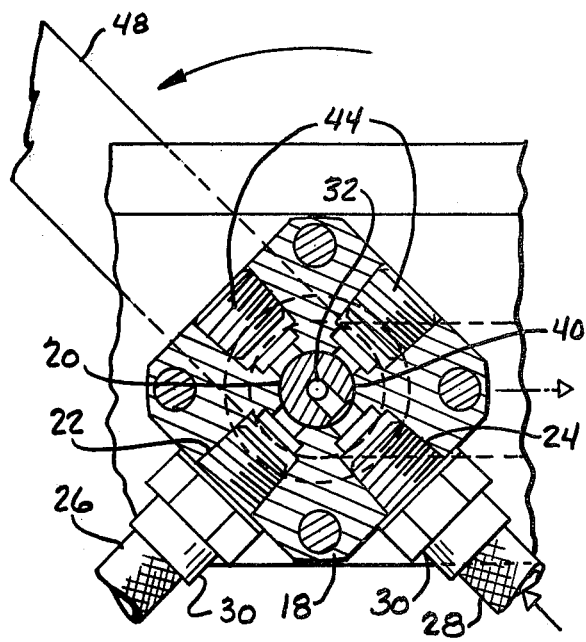
FIG. 4 is a cross-sectional view taken generally along line 4—4 of FIG. 1 and illustrating the positioning of the valves during cleaning or flushing.

While the invention will be described in connection with the preferred embodiment, it will be understood that it is not intended to limit the invention to that embodiment. On the contrary, it is intended to cover all alternatives, modifications and equivalents as may be included within the spirit and scope of the invention as defined by the appended claims. For example, while the present invention will be described in conjunction with a dispenser for polyurethane foam, it should be appreciated that the dispensing apparatus is certainly useful for dispensing other types of foams.

DESCRIPTION OF THE PREFERRED EMBODIMENT

Generally, the foam dispenser of the instant invention includes a barrel having a plurality of passages which allow communication between a mixing chamber and the sources of the fluid foam components and solvent. A nozzle is connected to the end of the barrel and communicates therewith to provide an opening for discharging the expanded foam from the dispenser. A rotary valve member for each principal foam component is provided, each having a single passageway formed therethrough to permit the introduction of either the foam component or the solvent through the valve and into the mixing chamber. The passageway of each valve is always in communication with the mixing chamber and can move between a position in which either a foam component or solvent is admitted into the gun. Each valve is provided with a tube for carrying the foam component to the dispenser, with each such tube having a corresponding tube for carrying the cleaning solution. The distance between where the supply tubes are attached to the dispenser and valves is so short that, after the valves are rotated so that the dispenser is flushed with the solvent, no significant amounts of foam components can buildup in the dispenser during normal usage.

Turning now to the illustrative embodiment, FIGS. 1 and 2 show generally a hand-held foam dispenser 10, having a handle 12 and nozzle 14 with a passageway for discharging the expanded foam, both attached to a barrel 16. On opposite sides of the barrel 16 are affixed bosses 18, each of which carries a rotary valve, generally indicated by 20, shown in FIGS. 4–6. A rotary valve is provided for each different fluid component required to make the expanded foam and, although generally only two principal components are required—polyol and isocyanate—thus necessitating only two valves 20, it is not intended that this invention be limited to such an embodiment. It should likewise be appreciated, as is well known, that additional foam components can be added to the polyol and isocyanate constituents if desired.

The foam components and cleaning solvent sources are connected to the dispenser by separate attachment means. Thus, as shown, each boss 18 has two internally threaded ports 22 and 24, best seen in FIGS. 4 and 5. To each port 22 and 24 is affixed a conduit, typically a flexible tube, tube 26 being attached to port 22 while tube 28 is attached to port 24. Each tube is removably secured to its respective port by a coupling 30, whose external threads cooperate with the internal threads of the port. Tubes 26 carry the different fluid components of the foam to the dispenser or gun while tubes 28 carry a cleaning solvent to the gun.

These tubes lead to sources of pressurized fluid foam components and cleaning solvent (not shown). The admittance of these fluids from the supply source into the tubes may be regulated by a valve between the tube and the supply source which is readily accessible to the operator of the foam dispenser. Suitable supply sources such as drums and the like are well known and may be employed. Such sources of foam components include 15 to 1000 gallon cylinders pressurized by applying pressurized nitrogen, supplied through a regulator, to the top of each cylinder. Suitable cleaning solvents for polyurethane foams are well known and include methylene chloride and 111 trichloroethane. However, the particular solvents used do not form a part of the present invention. Useful polyurethane foam components are likewise well known.

With respect to the valves 20, each has a single L-shaped passageway 32 with an outlet 34, which communicates through passage 38 with a mixing chamber 36. The mixing chamber 36, in turn, communicates with the nozzle 14. Passageway 32 also has an inlet 40, which alternately rotates between communication with tube 26 when foam is to be dispensed, and with tube 28 when the apparatus is to be flushed or cleaned following the completion of the foam dispensing operation.

Figure 5:
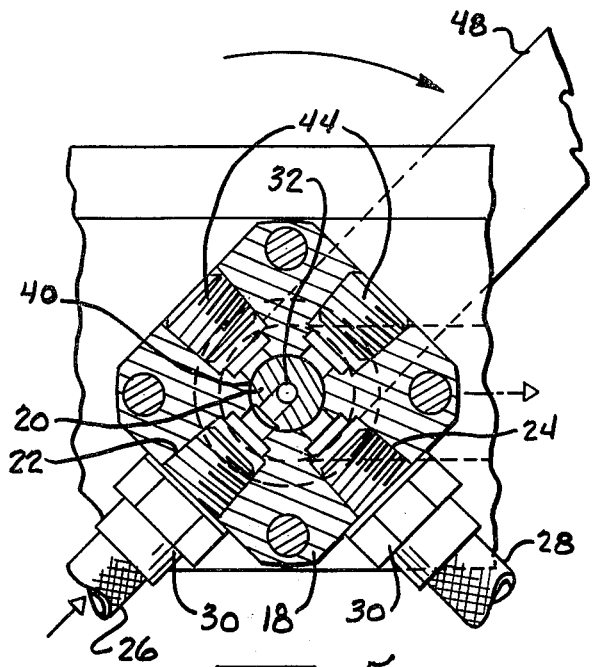
FIG. 5 is a cross-sectional view similar to FIG. 4 except showing the valves being positioned to admit fluid foam components.
Figure 6:
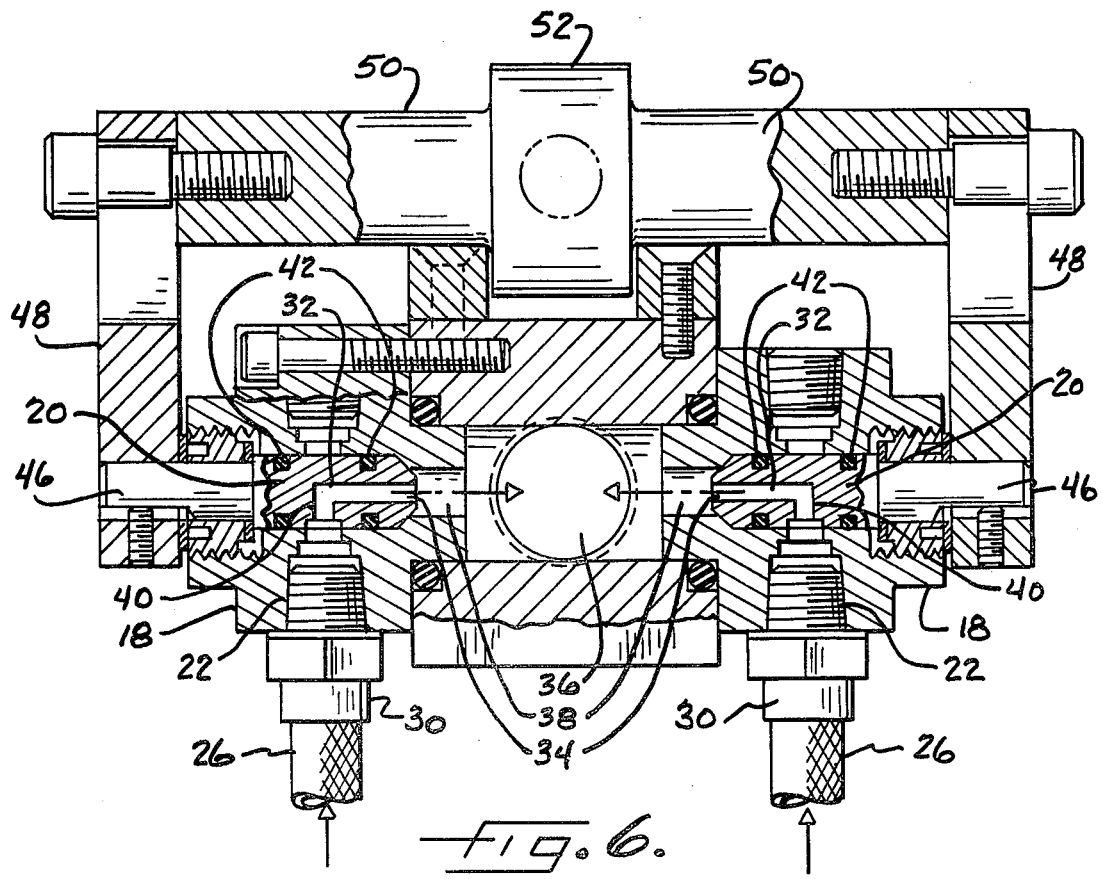
FIG. 6 is a cross-sectional view taken generally along line 6—6 of FIG. 3 and further illustrating the internal construction of the valves and passageways in the dispenser.

As best shown in FIGS. 4–6, it is a particular feature of this invention that when the valves 20 are in position to admit either fluid components or cleaning solvent, the inlets 40 are nearly coterminous with the ends of the couplings 30. Due to the single passageway 32 in each valve, once leaving the tubes, the cleaning solvent travels in the identical path that the foam components travel while in the dispenser. Because the distance between where either the foam components or solvent are introduced into the dispenser and where they enter the valves is reduced to a minimum, a more complete cleaning of the gun can be achieved than could previously.

Also, as best seen in FIG. 6, pursuant to the invention in which there are two valves, the outlets 34 of the valves are on diametrically opposite sides of the mixing chamber 36. This permits the foam components to impinge head-on when introduced into the mixing chamber 36, thus promoting a better mixing of the components than if they impinged at an angle to each other.

In the illustrated form, the valves are grooved to receive O-rings 42, best seen in FIG. 6, on which the valves are slidably mounted in a fluid-sealed relation with bosses 18. The bosses also have additional ports 44 which are filled with a lubricant, such as petroleum jelly or dioctylphthlate (DOP), and are plugged to allow for lubrication of the valves 20. The valve seats should desirably be made of a durable material so that the frequency of replacement can be minimized. Many suitable materials are known, and polytetrafluoroethylene resins can be thus desirably utilized.

A further feature of the present invention is its ability to deliver a predetermined amount of expanded foam. This feature is important when the foam is being introduced into a confined region, such as a refrigerator shell, as the operator wants to introduce neither too little nor too much foam but wants to precisely fill the volume of the region. To this end, the valve inlets 40 are aligned with the ports 22, through which the foam components are introduced, for only the amount of time sufficient to allow into the mixing chamber 36 the amount of the components needed to make the required volume of foam. After this time has elapsed, the inlets 40 move out of alignment with the ports 22, and no additional components are allowed to enter the mixing chamber 36. Thus, means are provided for moving all valves in unison between a position in which they communicate with the foam component carrying tubes and a position in which they communicate with the cleaning solution carrying tubes.

In the preferred embodiment, each valve 20 has a valve stem 46, best seen in FIG. 6, which extends out from the boss 18 and is keyed to be held for rotation by one end of a lever arm 48. The other end of each lever 48 is connected by an extension 50 to the rod 52 of a double acting air cylinder or piston 54 which is rigidly affixed to the foam dispenser 10 through an L-shaped bracket 56. The levers 48 are slotted to compensate for the straight-line movement of the piston rod 52. The movement of the piston rod 52 rotates the valves 20 in unison between the position in which foam components are allowed to enter the foam dispenser, when the piston rod 52 is in its extended position (shown in FIGS. 3 and 5), and the position in which cleaning solvent is admitted to the foam dispenser, when the piston rod 52 is in its retracted position (shown in FIGS. 2 and 4).

The piston 54 provides timed actuating means for the valves and is activated by the manipulation of a trigger-switch 58, which is located in the handle 12. When manipulated, the trigger 58 feeds either an air diverter valve or an electric control circuit (shown schematically in FIG. 2) which admits air to the left-hand side of the piston, extending the piston rod 52 to move the valves 20 in unison into position to admit foam component (FIG. 3). After being in such a position for the amount of time required to introduce into the dispenser the amount of foam components to make the desired volume of expanded foam, the piston rod 52 is automatically retracted by introducing air to the right-hand side of the piston to bring the valves 20 in unison into position to admit the cleaning solvent (FIG. 2) and thus flush the foam dispenser of all foam components or expanded foam to prevent the dispenser from becoming clogged.

In the preferred embodiment, trigger 58 is connected to a commercially available low voltage switchcord. The switchcord is connected to a commercially available timer which has thumb wheels on its front for varying the time of each dispensing sequence between 0.1 and 99.9 seconds. The timer also has an LED display which shows the time remaining before air is admitted to the right-hand side of the piston to retract the piston rod 52 and, thus, rotate the valves 20 so that no foam components are introduced into the gun. By knowing the volume of the container to be filled, the flow rate of the foam components into the gun, and the expansion rotate of the combined components, the operator can set the timer so that the volume of expanded foam generated by the gun precisely fills the container. After the timer is set, any number of identical-sized containers can be filled to the desired level by simply pulling the trigger 58 to initiate the timing sequence.

Thus, it is apparent that there has been provided in accordance with the invention, a foam dispenser that fully satisfies the objects and advantages set forth above. The single passageway in each valve allows cleaning of the dispenser at all points downstream of the foam components' entry into the valve while the short distance between the point where the foam components are introduced into the dispenser and the point where they enter the valves is so short that no significant buildup of foam components can occur. Thus the dispenser can be kept in operative condition at all times. Further, since the valves are actuated by mechanical means rather than manually actuated, timed actuation of the valves which permits repeated dispensing of a pre-determined volume of expanded foam is obtained.

I claim:

1. A foam dispenser for converting a plurality of foam components into an expanded foam and having means for flushing the dispenser with a cleaning solution after the foam is discharged comprising, in combination:
   (a) a barrel having a plurality of passages formed therein which communicate with a mixing chamber;
   (b) a nozzle connected to the barrel having a bore therethrough, one end of which communicates with the mixing chamber while the other end provides an opening for discharging the expanded foam from the dispenser;
   (c) a tube for carrying each foam component to the dispenser, each such tube having a corresponding tube for carrying the cleaning solution to the dispenser;
   (d) a rotary valve member for each pair of foam component and cleaning solution tubes, each such valve having a single passageway formed therethrough with an inlet and outlet, each valve being mounted for movement on the barrel so that the inlet of each valve is rotatable between positions nearly coterminous with the outlets of the foam component tubes and the cleaning solution tubes, and the outlet of the valve remains in communication with the mixing chamber; and
   (e) means for moving all valves in unison between communication with the foam component carrying tubes and communication with the cleaning solution carrying tubes so that after the foam components have been mixed and the expanded foam discharged from the dispenser the entire dispenser, from the point where the foam components enter the dispenser, can be flushed with the cleaning solution.

2. The foam dispenser of claim 1 in which the valves are moved by timed actuating means so that the inlet of each valve is in communication with its foam component carrying tube only for a period of time sufficient to allow the entry of components into the mixing chamber to make a pre-determined amount of expanded foam.

3. The foam dispenser of claim 1 or 2 in which the number of valves is two and the outlets of these valves are on diametrically opposite sides of the mixing chamber so that the foam components enter the mixing chamber from opposite directions and impinge with each other head-on.

4. The foam dispenser of claim 2 in which the timed actuating means comprises a double acting air cylinder whose piston rod is connected by lever arms to each valve and activated by manipulation of a trigger switch located in a handle which is attached to the barrel.

5. The foam dispenser of claim 4 in which manipulation of the trigger switch feeds an air diverter valve to activate the air cylinder.

6. The foam dispenser of claim 4 in which manipulation of the trigger-switch feeds an electric control circuit to activate the air cylinder.

* * * * *

UNITED STATES PATENT AND TRADEMARK OFFICE
CERTIFICATE OF CORRECTION

PATENT NO. : 4,440,320
DATED : April 3, 1984
INVENTOR(S) : Steven A. Wernicke

It is certified that error appears in the above—identified patent and that said Letters Patent is hereby corrected as shown below:

Column 5, line 1, "rotate" should be --rate--.

Signed and Sealed this

Nineteenth Day of June 1984

[SEAL]

Attest:

Attesting Officer

GERALD J. MOSSINGHOFF
Commissioner of Patents and Trademarks